H. L. SAWYER & G. E. PERRY.
MEASURING DISPENSING VESSEL.
APPLICATION FILED FEB. 1, 1915.

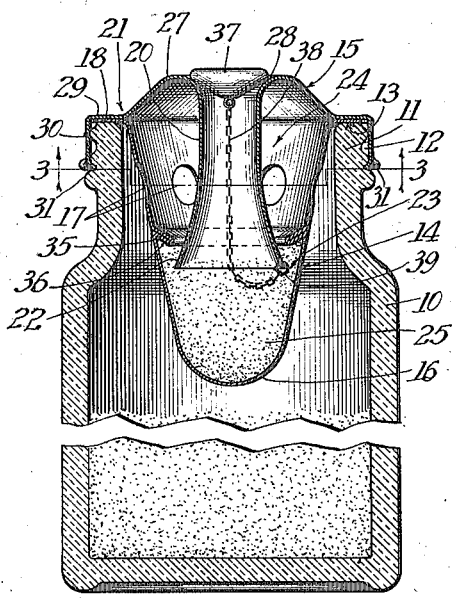
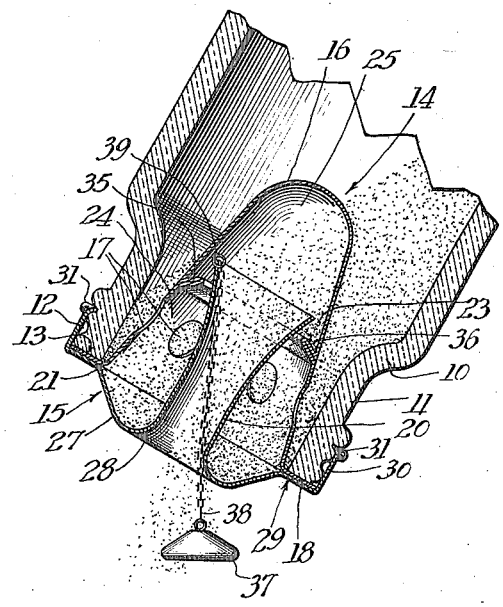
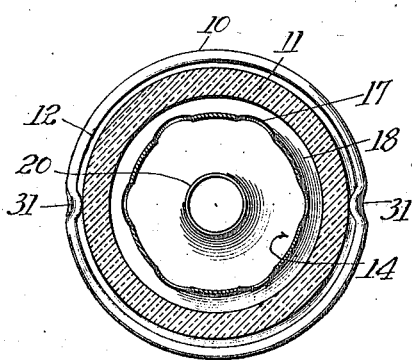

1,233,812.

Patented July 17, 1917.
2 SHEETS—SHEET 2.

Witnesses:
Robert H. Weir
Herbert G. Nalm

Inventor
Herbert L. Sawyer
and George Elliot Perry
Goree Bain a May Attys.

UNITED STATES PATENT OFFICE.

HERBERT L. SAWYER AND GEORGE ELLIOT PERRY, OF CHICAGO, ILLINOIS; SAID PERRY ASSIGNOR TO SAID SAWYER.

MEASURING DISPENSING VESSEL.

1,233,812.  Specification of Letters Patent.  Patented July 17, 1917.

Application filed February 1, 1915. Serial No. 5,515.

*To all whom it may concern:*

Be it known that we, HERBERT L. SAWYER and GEORGE ELLIOT PERRY, citizens of the United States, all residing at Chicago, in the county of Cook and State of Illinois, have invented certain new and useful Improvements in Measuring Dispensing Vessels, of which the following is a specification.

Our invention relates to improvements in measuring dispensing vessels for delivering a predetermined quantity of material each time the vessel is turned to delivery position.

One of the salient objects of our invention is to provide a device that will efficiently measure and dispense pulverulent material, such as granulated sugar, and in the accompanying drawing we illustrate a structure particularly designed to this end, although it will be apparent to those skilled in the art that embodiments of our invention may be used for measuring and dispensing a wide range of different materials and that the structures specifically illustrated are susceptible of many variations in detail of construction.

Another object of our invention is to provide the dispensing device in a self contained form that is readily attachable to or removable from a simple receptacle-body and a further object is to provide a dispensing attachment in a construction that may readily be disassembled into constituent parts so that all portions of the structure may be easily cleaned and kept in sanitary condition.

A further object of our invention is to make the dispensing structure simple, inexpensive, easily manufactured and assembled and attractive in appearance.

Other and further objects of our invention will become apparent to those skilled in the art from the following description taken in conjunction with the accompanying drawings in which—

Figure 1 is a vertical sectional view of a structure embodying our invention;

Fig. 2 is a similar view illustrating the manner of use thereof;

Fig. 3 is a horizontal section on line 3—3 of Fig. 1, looking in the direction of the arrows;

Fig. 4 is a perspective detail of the measuring and dispensing structure with parts separated.

Figure 5:
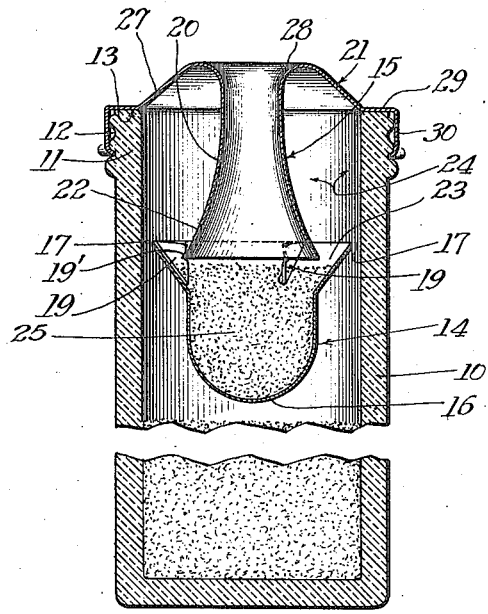
Fig. 5 is a vertical section showing a modified construction embodying features of our invention.
Figure 6:
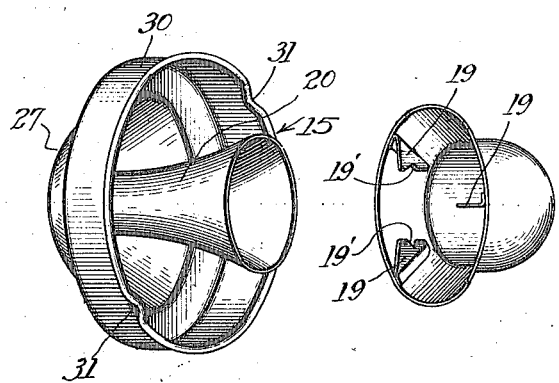
Fig. 6 is a detail, in perspective, showing the top parts separated.

In the drawings, (to refer first to features common to both embodiments shown) 10 indicates a glass receptacle having a circular neck 11 externally screw threaded as at 12 below the flat rim 13 of its open mouth; this typifying a simple, cheap form of body, open at one end only and having suitable means for attachment of a dispensing top structure thereto. 14 indicates a trap-forming receiver member, and 15 an eductor member, constituting the principal parts of a dispensing attachment for such receptacle, and preferably made of metal. The receiving member is an inverted conoidal shell having a closed pocket-forming bottom 16, and having an opening or openings 17 for communication with the receptacle located at or near the upper end of said shell. The conoidal shape of this member enables its larger end to be substantially as wide as the receptacle neck, and yet to afford free space around the shell to give passage for the material to flow from the receptacle, through the opening or openings 17, into the receiver. The eductor member 15 comprises an eductor tube 20 extending into the receiver, and a cap or cover portion 21 that is preferably integral with, or tightly fitted on, the eduction tube, and that coacts with the receptacle neck 11 to hold all of the fixed parts in their assembled relation. The eductor tube 20 preferably flares to a bell bottom 22, terminating in a plane between the pocket-forming bottom of the receiver and its side opening 17, and spaced somewhat from the side wall of the receiving member 14, so as to leave a passage 23 for material flow. Thus there is provided, around the eductor tube a receiving chamber 24 that is open to the receptacle body, at 17, and below the eductor there is provided a delivery chamber 25 that opens to the eduction tube and, via passage 23, to the receiving chamber. The receiving chamber should be somewhat larger than the delivery chamber, for best results.

This general construction of the device insures performance of its primary function of dispensing, or trapping out, in approximately measured quantities or charges, such suitable pulverulent or other materials as are susceptible of flow through the tortuous delivery passage. When the parts of the dispensing top are first assembled and the receptacle filled with material, such as granulated sugar, a turning of the receptacle, first upside down and then back to normal, will cause material first to flow into the receiving chamber 24, and then down through the passage 23 into the delivery chamber 25, so loading the device. Its condition is then substantially as indicated in Figs. 1 and 5. Thereafter, upon turning the device upside down, the action is substantially as graphically illustrated in Fig. 2: The material charge in delivery chamber 25 runs out through the eduction tube 20 while a fresh charge pours into receiving chamber 24 through the openings 17. Upon restoration of the device to normal position the fresh charge runs from chamber 24 to chamber 25, reloading the trap; and so on.

As matters of relative refinement, although some thereof are practically quite important, we prefer to incorporate in the structure some features that we will now further describe. It is advantageous that the dispensing structure as a whole may be removable from the receptacle body 10 in assembled condition and yet that it may be readily divisible into its component parts. In the particular constructions shown in Figs. 1 and 5 the cap portion 21 of member 15 is formed with a dome 27 that throws the mouth 28 of the eduction tube well beyond the receptacle body, that deepens the receiving chamber 24, and that lends attractiveness of design to the construction. Beyond the dome the cap has an annular surface 29 and a rim 30 that is arranged for screw threaded engagement with the neck 11 of the body 10, preferably through two indentations or teeth 31, on the rim. The receiving shell is positioned by the eductor member in detachable association therewith. Thus, in Fig. 1, the receiver cone extends to the receptacle mouth, where it has a flange 18 to be clamped between receptacle mouth 13 and the cap surface 29, and in said flange 18 are made notches 32 for passing the cap teeth 31, so that the two metal parts may be interconnected after the fashion of a bayonet lock. As long as the two parts 14 and 15 are locked together they may be handled as a unit, but obviously they are readily separable. In the construction shown in Fig. 5 the receiver 14 is shortened and flared, so that it extends, in a plane somewhat above the end of the eduction tube 20, nearly to the receptacle neck, the receiving chamber being thus partly formed by the receptacle neck instead of wholly within the receiver shell. In this construction shell 14 has fins 19, notched at 19' to be sprung over the flaring end of the eduction tube, so that the two parts are firmly, but detachably, connected.

Further we prefer in some instances that the construction be such that while the material, particularly if it be of a pulverulent nature, may flow readily from chamber 24 to chamber 25, its return through the same passage may be retarded. This, to prevent too much material running back into chamber 24 should the vessel be slowly tipped from upright position to discharging position. To this end we may, as shown in Fig. 1, provide a dam 35 on the side wall of chamber 24, just beyond the passage 23, and we give said dam, that may be conveniently of annular form, a reëntrant pitch so that it forms a sort of pocket 36 adjacent the passage 23. It will be apparent that such a dam structure will have a decided tendency to pocket any material that tends to flow back through the passage 23, thereby forming a sort of seal that will minimize the leakage back into chamber 24 from chamber 25.

Further we find it to be advantageous in some instances to provide a plug or valve 37 to close the mouth 28 of the eduction tube 20 when the receptacle is in normal position, but to permit substantially unobstructed flow of material when the receptacle is in delivery position. To this end, the plug 37 shown in Figs. 1 and 2 may conveniently be flexibly connected, as by a chain 38 and a detachable split ring 39 to an aperture near the end of tube 20. The operation of such a valve structure will be obvious in consideration of Figs. 1 and 2.

The dam and valve features are omitted from the construction shown in Fig. 5, but may, of course, be aplied thereto if desired.

While we have herein described in some detail a particular embodiment of our invention for purposes of full disclosure of one desirable form thereof, it will be apparent to those skilled in the art that many changes in detail might be made without departure from the spirit of our invention and within the scope of the appended claims.

Having described our invention, what we claim is:—

1. In a dispensing device of the character described, the combination with an open ended receptacle, of a structure comprising two separable sheet metal parts mutually engageable to define their relative positions and one of said members engaging the receptacle to lock the two in operative position, one such member comprising a dome-shaped receptacle-cap part merging curvingly at its central portion into an inturned eductor tube flaring at its bottom, and the other member comprising a cup concentrically positioned with respect to said tube and receptacle, having communication with the body of the receptacle and receiving within it the lower end of the flaring tube.

2. A dispensing device comprising in combination with an open ended receptacle body, an inverted conoidal receiver shell arranged in the top portion of said body, tapering to the inner edge of the mouth of said body and having a peripheral opening to the receptacle near the conoidal base, and an eductor member having a centrally disposed downwardly flaring tube opening at its lower end to the lower part of the receiver and at its upper end opening to the exterior of the vessel, said tube dividing the eductor encompassing region into two chambers communicating around the end of the eductor tube.

3. A dispensing device comprising in combination with an open ended receptacle body, having a threaded neck, an inverted conoidal receiver shell arranged in the top portion of said body, tapering to the inner edge of the mouth of said body, having a peripheral opening to the receptacle near the conoidal base, and a radially extending flange at its base overlying the end of said body, and an eductor member overlying the end of the receptacle and in screw threaded engagement with the neck thereof and a centrally disposed downwardly flaring tube opening at its lower end to the lower part of the receiver and at its upper end opening to the exterior of the vessel, said tube dividing the eductor encompassing region into two chambers communicating around the end of the eductor tube.

4. In combination, an open ended receptacle body having a threaded neck and a dispensing structure comprising two separable members, the one having a peripheral flange overlying the open end of the receptacle and the other a peripheral extension overlying the peripheral flange of the other member and in screw threaded engagement with the neck of the receptacle, said members having walls that, in assembled relation, form a tortuous passage open at one end to the receptacle body and at the other end to the exterior thereof, to pass materials through said passage in measured quantities upon alternate reversals of the receptacle.

In testimony whereof we hereunto set our hands.

HERBERT L. SAWYER.
GEORGE ELLIOT PERRY.

In the presence of—
STANLEY W. COOK,
MARY Y. ALLEN.